May 26, 1964

W. V. ASTRUP 3,134,431

SHELL-AND-TUBE HEAT-EXCHANGER CORE-UNIT

Filed Feb. 2, 1962

INVENTOR:
WILLIAM V. ASTRUP
BY
ATT'Y

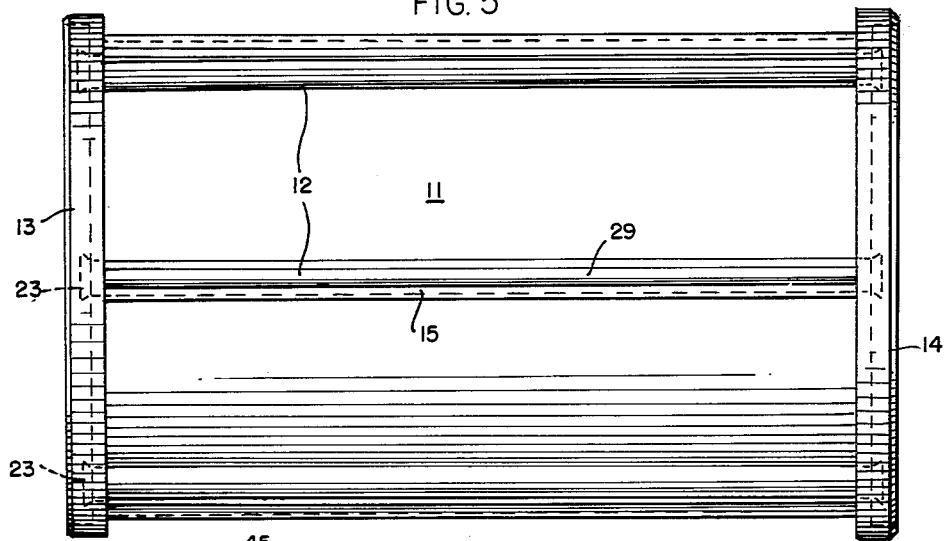
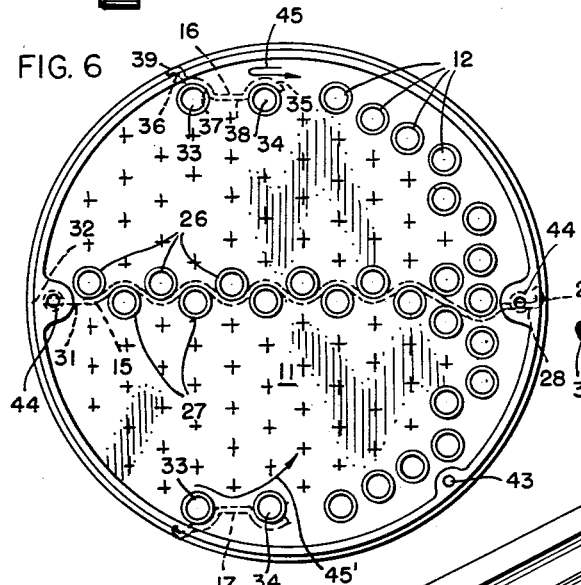
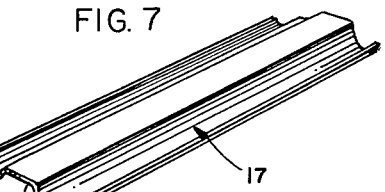
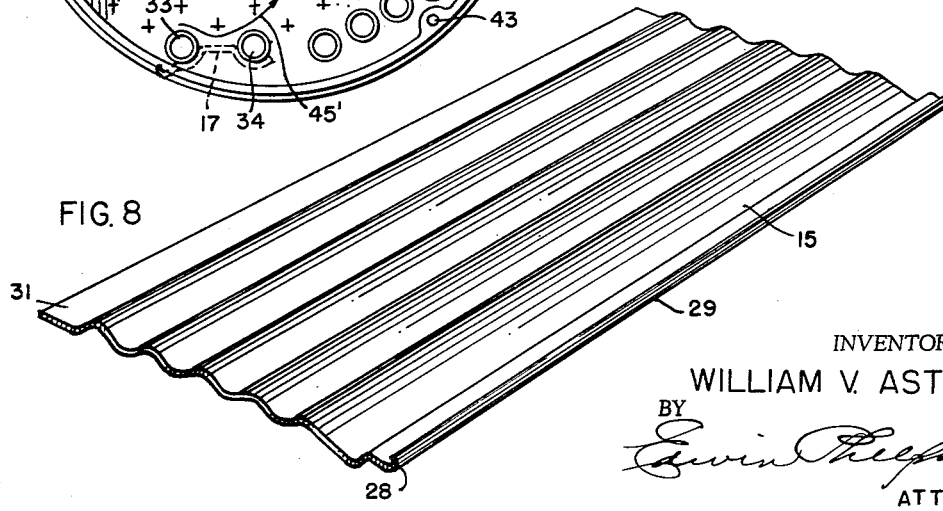

United States Patent Office 3,134,431
Patented May 26, 1964

3,134,431
SHELL-AND-TUBE HEAT-EXCHANGER CORE-UNIT
William V. Astrup, Racine, Wis., assignor to Young Radiator Company, Racine, Wis., a corporation of Wisconsin
Filed Feb. 2, 1962, Ser. No. 170,682
1 Claim. (Cl. 165—160)

This invention relates to core-units for heat-exchangers of the type generally known as "shell-and-tube."

High-horse-power heat-engines, structured for use with certain types of motor equipment, require a comparatively small and very compact form of the conventional shell-and-tube type of heat exchanger for cooling the lubricating oil needed for the engine.

The main objects of this invention are to provide an improved structuring of the core unit for heat-exchangers of the shell-and-tube type; to provide an improved arrangement of baffles in the core-unit for directing the flow of fluid through the labyrinth surrounding the tubes of the core unit; and to provide a core-unit construction of this kind especially adapted for use for cooling the lubricating oil required for high-powered heat-engines.

In the adaptation shown in the accompanying drawings:

FIG. 5 is an enlarged, side elevational view of a core-unit constructed in accordance with this invention;

FIG. 6 is an end view of the same;

FIG. 7 is a perspective view of a section of the supplemental baffles; and

FIG. 8 is a perspective view of a section of the primary baffle.

Figure 1:
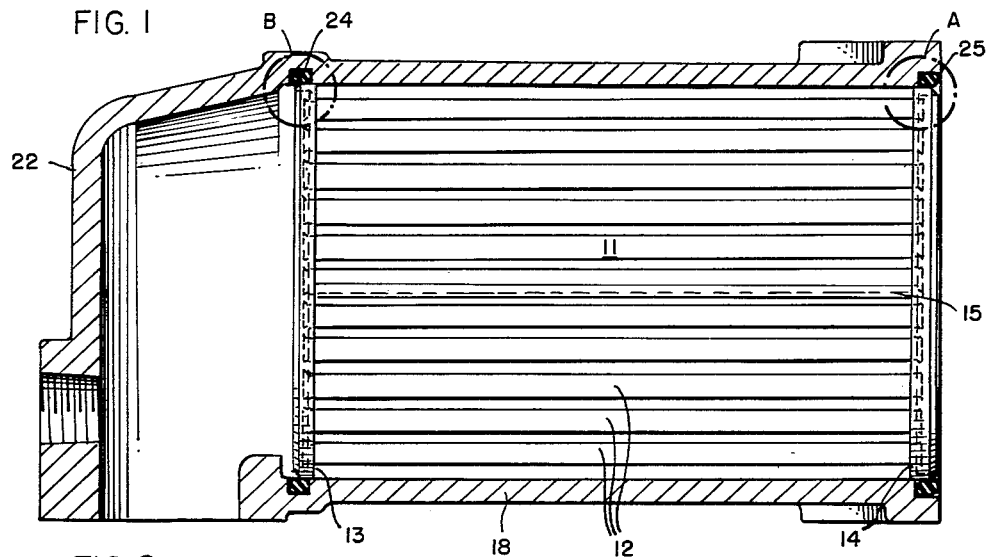
FIG. 1 is a longitudinal partly sectional and partly elevational, view of a shell-and-tube heat exchanger core-unit constructed in accordance with this invention.

The essential concept of this invention, for a core-unit comprising a battery of spaced parallel tubes spanning and supporting disk-shaped headers and encased in a supporting shell, involves a longitudinally-disposed primary baffle and supplemental baffles, the primary baffle being medially postioned to divide the labyrinth around the tubes into two compartments having communication through a narrow passage around one lateral edge of the primary baffle and the supplemental baffles being positioned adjacent opposite perimetrical groups of tubes so as to control the fluid flow through the labyrinth toward and away from the passage around the one lateral edge of the primary baffle.

A core unit 11 embodying the foregoing concept comprises a battery of tubes 12 spanning and supporting headers 13 and 14 wherein is arranged a primary baffle 15 and supplemental baffles 16 and 17.

Such a core unit 11 is for use in a conventional cylindrical shell 18 to constitute a heat exchanger generally designated as a "shell-and-tube" type. The shell 18 has inlet and outlet ports 19 and 20 leading to the labyrinth 21 around the tubes 12 and mounts end bonnets 22 (only one of which is shown in the drawings) communicating with the passages through the tubes 12. One of the conventional uses of such a heat exchanger is the cooling of lubricating oil for high horse-power heat-engines. The oil flows from the engine through the labyrinth 21 and the coolant flows through the tubes 12 to and from an appropriately-formed and -positioned radiator.

The tubes 12 preferably are seamless copper and dimensioned to fit in holes in the headers 13 and 14 reamed to exact size for an effective solder bonding of the tubes and headers. The tubes 12 also have their ends belled out, as shown at 23 in FIG. 5 to ease the entry of the coolant from the inlet bonnet 22.

The headers 13 and 14 are forged brass and are machined to an outside peripheral diameter of a very close tolerance and with an outwardly-facing bevel for telescopic insertion into the shell 18 and very firm fitting with the O-ring seals 24 and 25.

The primary baffle 15, formed of spring brass is given an undulating form, much like corrugated steel sheets. It is interposed between and partially embracing of the immediately-adjacent, staggered, medial rows 26 and 27 of tubes 12 to divide the labyrinth 21 into two compartments. The baffle 15 is of a length to span the distance between the opposed faces of the headers 13 and 14 to which the baffle is bonded at its ends. The lateral portion 28 of the baffle 15 is curled inwardly to form the exterior arcuate perimeter 29. The other lateral portion 31 of the baffle 15 is straight. The baffle 15 extends diametrically across the core 11 with the arcuate edge 29 concentric with the peripheries of the headers 13 and 14 and with the edge of the lateral portion 31 a very short distance inwardly of the peripheries of the headers 13 and 14. Thus, with the core unit 11 in place in the shell 18 the arcuate edge 29 of the baffle 15 contacts the inner wall of the shell and there forms a seal between the two compartments of the labyrinth 21 so that communication between these two compartments is limited to a narrow passage 32 between the edge of the lateral portion 31 and the opposed wall of the shell 18.

The supplemental baffles 16 and 17 also are formed of spring brass and are identical in dimension and contour. In length these two baffles span the distance between the opposed faces of the headers 13 and 14 to which the baffles 16 and 17 are bonded at their respective ends. In width each of these baffles 16 and 17 is greater than the over-all distance between the two tubes 33 and 34 most oppositely remote from the primary baffle 15. In transverse contour each baffle is shaped to form a nearly semi-circular arcuate lateral portion 35, a curled lateral portion 36, and an intermediate nearly-quadrant-shaped arcuate portion 37 and flat portion 38. These several portions 35, 37 and 38 are so shaped and transversely spaced that each baffle 16 and 17 is adapted to tightly seat over and be bonded to the two respective tubes 33 and 34 to dispose the perimeter 39 of the lateral portion 36 concentrically with the peripheries of the headers 13 and 14.

Figure 2:
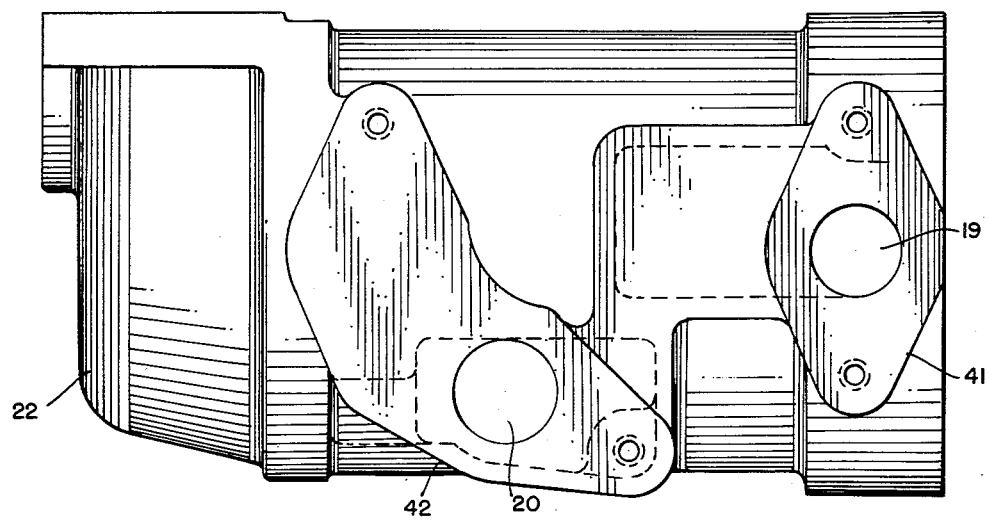
FIG. 2 is an exterior side elevational view from the opposite side of FIG. 1.
Figure 3:
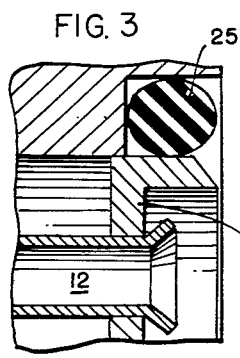
FIG. 3 is an enlarged, fragmentary, sectional view of the O-ring seal shown in the circle "A" of FIG. 1.
Figure 4:
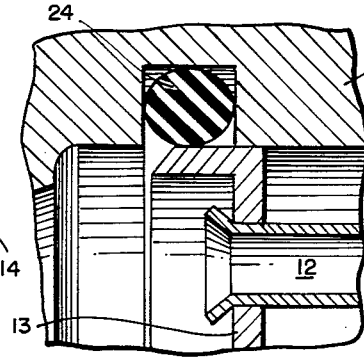
FIG. 4 is a similar view of the opposite O-ring seal shown in the circle "B" of FIG. 1.

Many are the forms of shell 18 with which this form of core unit is adapted for use. The structure shown in FIGS. 1 and 2 is but one of such shells 18. That shell 18 is cast metal with one end bonnet 22 integrated. The other end bonnet (not shown) generally would be bolted to the shell 18. To these bonnets 22 would be attached conduits leading from and to the fluid source that is to flow through the tubes 12. As here shown, the pair of axially- and circumferentially-spaced ports 19 and 20 with bordering flanges 41 and 42 are integrated with the shell for the attachment of conduits leading from and to the source of fluid which is to flow through the labyrinth 21.

To insure proper assembly of the core unit 11, of this construction, in the shell 18 one of the headers 13 or 14 has a locating mark 43 stamped on the rim (see the "o" in FIG. 6). A similar locating mark would be stamped on the rim of the shell 18 to indicate proper functional positioning of the core unit 11 in the shell 18.

For a shell of the structure shown in FIGS. 1 and 2, one of the headers 13 or 14 would have threaded holes 44 formed therein for the insertion of an instrument to permit withdrawal of the core unit 11 from the shell 18 as occasion might require.

During the operation of a heat exchanger comprising a core unit 11, constructed in accordance with this invention, the function of the baffle 15 is to divide the labyrinth 21 into the two compartments communicating only through the narrow lateral passage 32. The function of the supplemental baffles 16 and 17 is to preclude all possibility of a direct flow of fluid through the space between the outer ring of tubes 12 and the opposed wall of the shell to and from the narrow passage 32 (FIG. 6) at the edge of the primary baffle 15. More specifically, the fluid flow entering from the inlet 19, into the labyrinth above the primary baffle 15, normally tends to travel upwardly into the space 46 between the arcuate row of outer tubes 12 and the opposed wall of the shell 18. But for the supplemental baffle 16 such a flow would continue on around the similar space on the other side of the shell and through the passage 32 at the edge of the primary baffle 15. However, because of this supplemental baffle 16, the flow up through the space 46 is blocked and turned back, as shown by the arrow 45. Accordingly, this reversal of the flow is directed downwardly into the labyrinth around the inner tubes 12 above the primary baffle 15 on its way over to the passage 32. The fluid flow being thus forced through the labyrinth above the baffle 15 effects a greater heat dissipation than occurs with similar structures not having such a supplemental baffle 16.

A similar condition obtains for the fluid flow from the passage 32 into the labyrinth below the primary baffle 15. Whatever normal tendency there may be for that flow to seek the less restricted space between the outer row of tubes 12 and the opposed wall of the shell 18, such a flow will be blocked by the supplemental baffle 17 and forced to move upwardly as indicated by the arrow 45', as the flow seeks release through the outlet port 20. Being thus forced to a more restrained flow, upwardly through the more closely-spaced tubes 12, a greater heat dissipation will occur than would be the case with a similar heat exchanger without such a supplemental baffle 17.

Variations and modifications in the details of structure and arrangement of the parts may be resorted to within the spirit and coverage of the appended claims.

I claim:

A pre-assembled core-unit, adapted for telescopic insertion into and removal from one end of a shell of a heat-exchanger used for the cooling of lubricating oil for high-powered heat engines, (a) a pair of disk-shaped headers spanned by and supporting a battery of parallel tubes and having their peripheries dimensioned for substantially fluid-tight contact with the interior wall of the shell, (b) a primary baffle spanning the distance between the headers and secured at its ends in diametrical position to the respective headers with the one lateral edge throughout its entire length coplanar with the peripheries of the headers and the other lateral edge throughout its entire length spaced a very short distance inwardly from coplanar relationship with the peripheries of the headers to provide a restricted fluid-flow passage between the labyrinth on opposite sides of the primary baffle, and (c) a pair of supplemental baffles each spanning the distance between the headers and secured at their respective ends to the headers and having the inner lateral portion of semi-circular contour and partially embracing the inner of two adjacent tubes most remote from the primary baffle and nearest the peripheries of the headers and having an intermediate portion of quadrant circular form to seat over the other of the two tubes, and having the other lateral portion of arcuate form with the extreme edge disposed inwardly of coplanar relationship with the peripheries of the headers, and the crown thereof coplanar with the header peripheries for contact with the inner wall of the shell.

References Cited in the file of this patent
UNITED STATES PATENTS

| | | |
|---|---|---|
| 1,791,468 | Leonard | Feb. 3, 1931 |
| 2,147,719 | Simons | Feb. 21, 1939 |
| 2,223,662 | Lear | Dec. 3, 1940 |
| 2,396,650 | Hannah | Mar. 19, 1946 |
| 2,587,801 | Woods | Mar. 4, 1952 |
| 2,783,980 | Christensen | Mar. 5, 1957 |